United States Patent [19]

Fliearman et al.

[11] Patent Number: 5,738,605
[45] Date of Patent: Apr. 14, 1998

[54] ANTI-HUNT STRATEGY FOR AN AUTOMATIC TRANSMISSION

[75] Inventors: Steven R. Fliearman, Howell; Kenneth J. Potter, Almont; Dennis R. Zeiger, Oak, all of Mich.

[73] Assignee: Chrysler Corporation, Auburn Hills, Mich.

[21] Appl. No.: 672,883

[22] Filed: Jun. 28, 1996

[51] Int. Cl.[6] .................................................. B60K 41/04
[52] U.S. Cl. ...................................... 477/108; 477/120
[58] Field of Search .................................. 477/108, 110, 477/111, 141, 139, 120, 125, 904; 475/125; 74/337

[56] References Cited

U.S. PATENT DOCUMENTS

| | | | |
|---|---|---|---|
| 4,625,590 | 12/1986 | Muller | 477/120 |
| 4,660,672 | 4/1987 | Katou | 477/108 X |
| 4,875,391 | 10/1989 | Leising et al. | 477/155 |
| 4,905,545 | 3/1990 | Leising et al. | 474/133 |
| 4,951,200 | 8/1990 | Leising et al. | 364/424.1 |
| 5,012,419 | 4/1991 | Yamamoto | 477/108 X |
| 5,129,475 | 7/1992 | Kawano et al. | 477/108 X |
| 5,241,476 | 8/1993 | Benford et al. | 477/120 X |
| 5,272,939 | 12/1993 | Markyvech et al. | 477/120 |
| 5,361,207 | 11/1994 | Hayafune | 477/120 X |
| 5,377,110 | 12/1994 | Ikeura | 477/110 X |
| 5,510,982 | 4/1996 | Ohnishi et al. | 477/120 X |

Primary Examiner—Khoi Q. Ta
Assistant Examiner—Peter T. Kwon
Attorney, Agent, or Firm—Mark P. Calcaterra

[57] ABSTRACT

An anti-hunt transmission control strategy for controlling an automatic transmission so as to prevent the occurrence of a shift hunting condition. The control strategy determines a learned vehicle inertia as well as road load torque and expected torque in an upshift gear. A projected post shift acceleration is predicted based on the expected torque, road load torque and inertia of the vehicle. If vehicle speed and throttle position are within an allowable shift zone and if the predicted post shift acceleration exceeds a threshold value, the vehicle automatic transmission is allowed to upshift. Otherwise, should the predicted post shift acceleration not exceed the threshold value, an upshift is prevented.

14 Claims, 3 Drawing Sheets

ANTI-HUNT STRATEGY FOR AN AUTOMATIC TRANSMISSION

BACKGROUND OF THE INVENTION

1. Technical Field

The present invention relates generally to automatic transmission control for an automotive vehicle and, more particularly, to an anti-hunt transmission control strategy for controlling the gear shifting for an automatic transmission so as to prevent a shift hunting condition.

2. Discussion

Automotive vehicles generally incorporate a motive force system having three basic components: an engine, a powertrain and wheels. The engine produces force by converting chemical energy from a liquid fuel into the mechanical energy of motion. The powertrain transmits the resultant force of this kinetic energy to the wheels which frictionally contact a surface for moving the vehicle. The main component of the powertrain is the transmission, which transmits engine torque over a relatively limited angular speed range to the wheels over a broader speed range, in accordance with the tractive-power demand of the vehicle. The transmission also controls the direction of rotation applied to the wheels so that the vehicle may be driven both forward and backward.

One advanced type of transmission is a four speed electronically controlled automatic transmission with overdrive. Examples of this type of electronically controlled automatic transmission are described in U.S. Pat. No. 4,875,391, entitled "An Electronically-Controlled, Adaptive Automatic Transmission System", issued on Oct. 24, 1989 to Leising et al; U.S. Pat. No. 4,905,545, entitled "Method of Controlling the Speed Change of a Kickdown Shift for an Electronic Transmission System", issued on Mar. 6, 1990 to Leising et al and U.S. Pat. No. 4,951,200, entitled "Method of Controlling the Apply Element During a Kickdown Shift for an Electronic Automatic Transmission System", issued on Aug. 21, 1990 to Leising et al. These patents are owned by the Assignee of the present application and are incorporated herein by reference. However, it should be appreciated that the principles of the present invention are not limited to any particular automatic transmission, whether electronic or hydraulic controlled and that the present invention may be applied to a wide variety of other powertrain configurations.

A vehicle is generally equipped with an electronic control system for controlling the operation of the engine and drivetrain of the vehicle. The electronic control system includes a microcomputer-based transmission controller capable of receiving and monitoring input signals indicative of various vehicle operating conditions such as engine speed, torque converter turbine speed, output vehicle speed, throttle angle position, brake application, hydraulic pressures, a driver selected gear or operating condition (PRNODDL), engine coolant temperature and/or the ambient air temperature. Based on the information contained in the monitored signals, the controller generates command or control signals for causing actuation of solenoid-actuated valves to regulate the application and release of fluid pressure to and from apply cavities of clutches or frictional elements of the transmission. Accordingly, the transmission controller is typically programmed to execute predetermined shift schedules stored in memory of the controller through appropriate command signals to the solenoid-actuated valves.

For vehicles equipped with an automatic transmission, the transmission may undergo repetitive upshifting and downshifting of the automatic transmission as the transmission controller follows the predetermined shift schedules that are programmed in memory. Under certain conditions of load it is possible to schedule an upshift to a gear that does not provide sufficient torque to maintain the vehicle speed. For example, as the vehicle slows down, the shift schedule causes a downshift to a lower gear which in turn provides ample torque for acceleration up to the point of the upshift speed. Once the upshift occurs, the cycle repeats until the load condition changes. This cyclical upshifting and downshifting of the transmission to maintain the desired speed can lead to a "shift hunting" condition. This is even more evident when traveling uphill on a steep incline and/or with a heavy vehicle load in which the automatic transmission may repeatedly upshift and downshift between gears in order to attempt to maintain the desired vehicle speed. Repeated upshifts and downshifts in turn affect the overall sound and feel of the vehicle which can be quite noticeable to the driver and passengers of the vehicle.

This shift hunting problem may occur with either the presence of cruise speed control or manual speed control and the shift hunting condition can be made worse by operator intervention. For example, the driver may sense changes in speed and make the appropriate responsive adjustments to the accelerator pedal which controls the throttle opening position in an attempt to maintain steady vehicle speed. Quite often these changes in throttle opening position generally serve only to increase the frequency of the shift hunting condition.

To overcome this shift hunting problem, it is generally necessary to employ an anti-hunt transmission control strategy which provides adaptive shift point control to prevent the occurrence of shift hunting. Typical shift strategies, whether hydraulic or electronic controlled, are usually mapped against the amount of throttle opening and vehicle speed or engine speed to provide the shift schedule points. These shift schedule maps are generally optimized for normal operating conditions and quite often attempt to balance the fuel economy and performance of the vehicle.

It is therefore one object of the present invention to provide for a system and method of controlling gear shifting of an automatic transmission for a motor vehicle while minimizing the occurrence of shift hunting.

It is another object of the present invention to provide for such a control system and method which reduces noticeable changes in vehicle performance which may otherwise occur due to upshifting and downshifting of a vehicle's automatic transmission so as to enhance vehicle performance.

Further, it is another object of the present invention to monitor torque and vehicle load and predict available acceleration to control transmission gear shifting of an automatic transmission to prevent shift hunting, especially for a vehicle traveling uphill and/or hauling a heavy load.

SUMMARY OF THE INVENTION

To achieve the foregoing objectives, the present invention is an anti-hunt transmission control strategy for controlling shifting of an automatic transmission of a vehicle to prevent shift hunting of the automatic transmission. Following stopping of the vehicle, an approximate learned vehicle inertia is determined and used to determine road load torque. With the automatic transmission engaged in a lower gear, the output torque is determined for the lower gear and a predicted torque available in an upshift condition of the transmission to an upper gear is determined. Projected post shift acceleration available in the upper gear is predicted and compared with a threshold value. Provided the shift schedule point is within an allowable shift zone and if the predicted post shift acceleration value exceeds the threshold value, the automatic transmission is caused to shift to the upshift gear. If the projected post shift acceleration does not exceed the threshold value, the automatic transmission is inhibited from shifting to the upshift gear.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
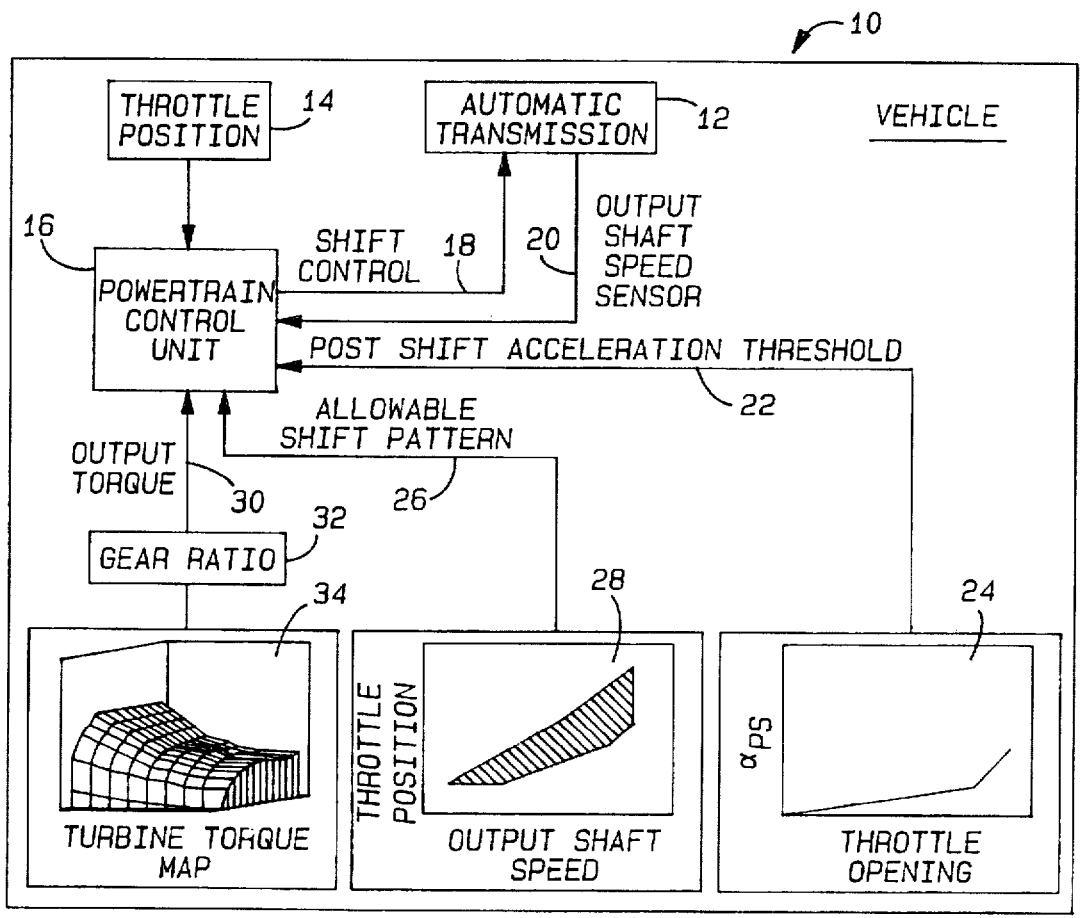
FIG. 1 is a block diagram illustrating a vehicle equipped with an automatic transmission controlled in accordance with an anti-hunt control strategy according to the present invention.

Turning now to FIG. 1, a vehicle 10 is provided as a block equipped with an automatic transmission 12 that is controlled so as to prevent the occurrence of a shift hunting condition. The automatic transmission 12 is advantageously controlled in accordance with an anti-hunt transmission control routine which monitors torque and load and predicts the availability of post shift acceleration and prevents an upshift if insufficient acceleration would be available to overcome road load and maintain vehicle speed as desired. While the present invention is described herein in connection with an electronic or hydraulic controlled four-speed transmission, it should be appreciated that various other automatic transmissions may be employed in connection with the anti-hunt control strategy of the present invention.

The vehicle 10 further includes a powertrain control unit 16 in communication with the automatic transmission 12. The powertrain control unit 16 preferably is microprocessor-based and includes memory which contains an anti-hunt control routine for preventing the occurrence of shift hunting with the automatic transmission 12. While the powertrain control unit 16 is described as containing the anti-hunt control routine and other transmission control routines, it should be appreciated that the anti-hunt control routine and other transmission control routines could alternately be provided in other control devices such as a transmission control module.

The powertrain control unit 16 receives various vehicle parameters and determines when to shift among the various gears of the automatic transmission 12 based upon the predetermined shift schedule as well as the anti-hunt control routine. In doing so, the powertrain control unit 16 outputs a shift control signal 18 to the automatic transmission 12 to control upshifting and downshifting of the transmission. Additionally, the automatic transmission 12 provides an output shaft speed sensor signal 20 which is received as an input by the powertrain control unit 16.

It should be appreciated that the powertrain control unit 16 typically receives various other inputs such as a brake switch signal, coolant temperature, ambient temperature, battery, distributor and ignition switch information as is generally provided to powertrain control unit in a motor vehicle. It should also be understood that the control unit 16 or a transmission control module (not shown) typically receives various other signals such as a pressure switch input, a driver selected transmission position (PRNDL) signal which provides an indication of the manually selectable transmission operating mode, a manifold pressure (MAP) signal, cruise control signals, vehicle speed and brake signals. It should also be appreciated that various signals could be received via a communication line or network such as a Chrysler Collision Detection (CCD) network and such a network may interconnect a transmission control module with the powertrain control unit 16.

The powertrain control unit 16 also receives a throttle position signal 14 which is indicative of the position of the throttle that is controlled in response to either driver actuation of the acceleration pedal or a cruise control system, if employed. Powertrain control unit 16 further receives a post shift acceleration threshold signal 22, an allowable shift pattern signal 26 and an output torque signal 30. The post shift acceleration threshold signal 22 is provided from a look-up table 24 which contains stored threshold values as a function of throttle opening position. The allowable shift pattern signal 26 is provided from a look-up table 28 which plots the throttle position and either output shaft speed or vehicle speed. The output torque signal 30 is provided from a turbine torque mapped surface 34 through a conversion via a gear ratio convertor 32.

Figure 2:
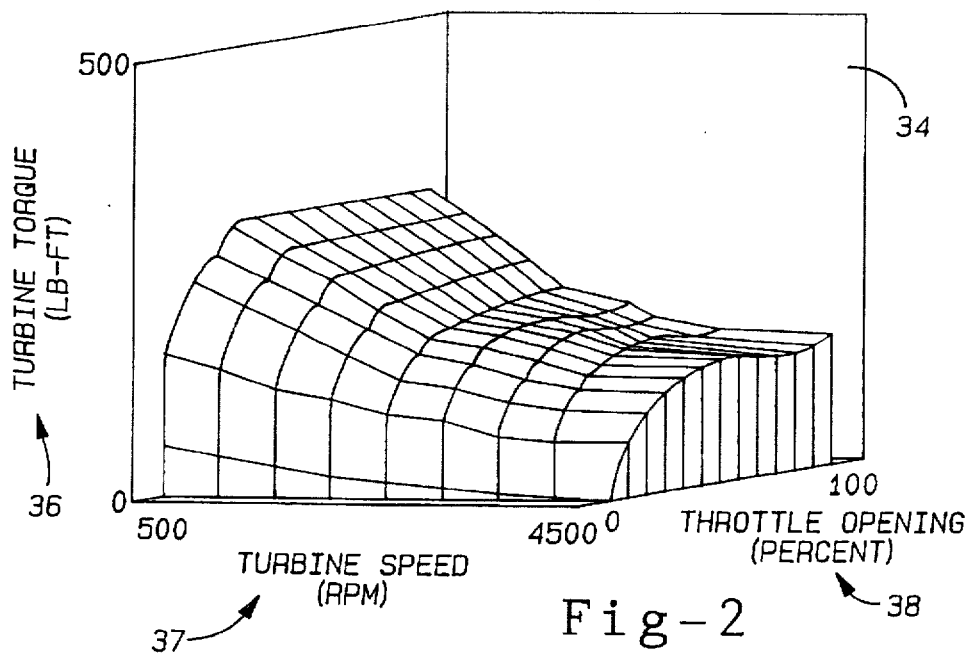
FIG. 2 is a three-dimensional look-up surface which provides turbine torque based on turbine speed and throttle opening percentage.

The turbine torque mapped surface 34 is shown in greater detail in FIG. 2. Turbine torque mapped surface 34 is a three-dimensional surface containing stored turbine torque (LB-FT) values 36 based on turbine speed (RPM) 37 and throttle opening percentage 38. Given the turbine speed 37 and throttle opening percentage 38, the appropriate turbine torque 36 is provided from turbine torque mapped surface 34. The determined turbine torque value 36 is then converted by the gear ratio converter 32 and thereafter supplied to the powertrain control unit 16 as an output torque signal 30. The converted turbine torque is therefore converted in accordance with the gear ratio to provide the transmission output torque.

Figure 3:
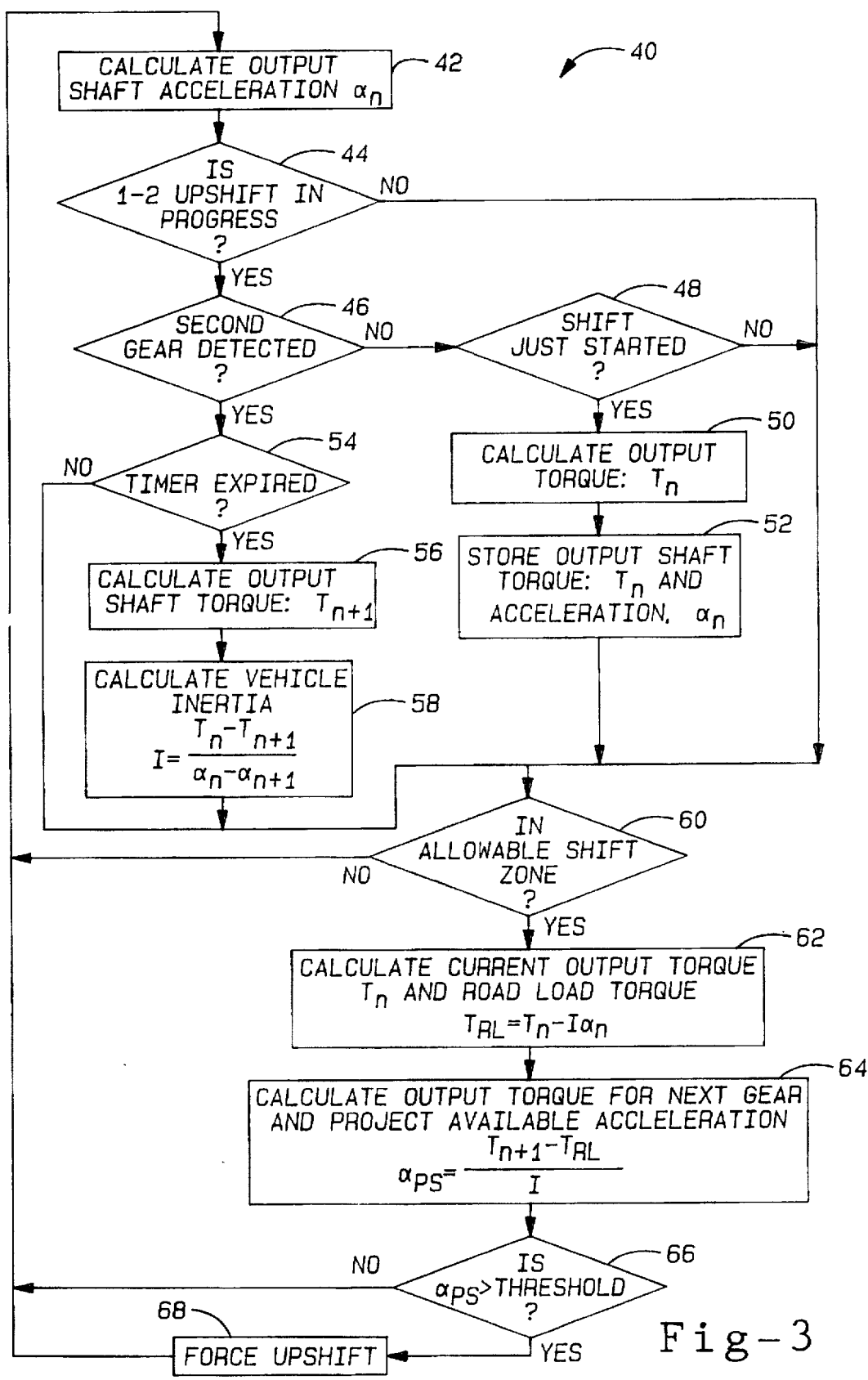
FIG. 3 is a flow diagram illustrating an anti-hunt control methodology for controlling automatic transmission gear shifting in accordance with an anti-hunt strategy of the present invention.

Referring to FIG. 3, an anti-hunt transmission control methodology 40 is provided for controlling the gear shifting of the automatic transmission 12 so as to prevent the occurrence of an anti-hunt condition according to the present invention. Control methodology 40 uses sensed vehicle parameters and repeatedly calculates the output shaft acceleration $\alpha_n$ for the currently engaged transmission gear (n) as provided in block 42. Control methodology 40 initially determines a learned vehicle inertia (I) while the automatic transmission is performing a transmission gear upshift. The optimal condition for determining vehicle inertia is found to be under conditions where a significant change in output torque occurs while the road load remains relatively constant. A change in gear ratio during a transmission shift meets these requirements with a sharp change in output torque that is determined by a look-up table. According to a preferred embodiment, control methodology 40 will determine vehicle inertia I during the first transmission gear upshift from first gear to second gear (e.g., 1–2 upshift) following each time the vehicle is stopped. Therefore, the learned vehicle inertia I adapts to changes in inertia as determined after each vehicle stop.

To determine vehicle inertia I, control methodology 40 will check to see if a first gear-to-second gear (1–2) upshift is currently in progress pursuant to decision block 44. If the 1–2 upshift is detected, control methodology 40 proceeds to check to see if the second gear has been detected pursuant to decision block 46. If second gear has not yet been detected, decision block 48 will check to see if the 1–2 shift has just started and, if so, control methodology 40 will calculate output torque ($T_n$) for the currently engaged transmission gear (n) as provided in block 50, and thereafter will store the output shaft torque $T_n$ and acceleration $\alpha_n$ in memory as provided in block 52. The output torque $T_n$ as referred to herein is the torque at the output of the transmission.

Once second gear has been detected, control methodology 40 proceeds to decision block 54 to see if a timer has expired. The timer provides a time delay during which the abrupt transmission gear transition generally is known to occur which causes disturbance of the output torque that is to be avoided in the measurement. Once the timer has expired, control methodology 40 calculates the output shaft torque $T_{n+1}$ for the upshift gear (n+1) pursuant to block 56. Output shaft torque $T_{n+1}$ is the output shaft torque calculated for the transmission gear upshift which in this case is second gear. Thereafter, control methodology 40 will calculate vehicle inertia I as provided in block 58. Vehicle inertia I can be calculated by dividing the difference in output torque in first gear and second gear represented by ($T_n - T_{n+1}$) by the difference in acceleration in the first gear and second gear represented by ($\alpha_n - \alpha_{n+1}$). These torque and acceleration measurements are taken in first gear just prior to the upshift and in second gear just after the upshift occurs. It is preferred that the measurements be taken during the shortest time period possible without realizing effects caused by the shift induced disturbance. This also allows the assumption of a constant road load torque $T_{RL}$.

Once the vehicle inertia I has been determined, the road load torque $T_{RL}$ at the transmission output shaft can be calculated. The torque $T_n$ at the transmission output shaft is equal to the product of vehicle inertia I and acceleration $\alpha_n$ summed with road load torque $T_{RL}$. Road load torque $T_{RL}$ generally includes torque losses which take into consideration aerodynamic drag of the vehicle, rolling resistance of the tires and frictional losses in the drivetrain as well as the grade of the road that the vehicle is traveling on. In effect, the output torque from the transmission will be consumed by the road load torque or be expressed as an acceleration of the output shaft.

Figure 4:
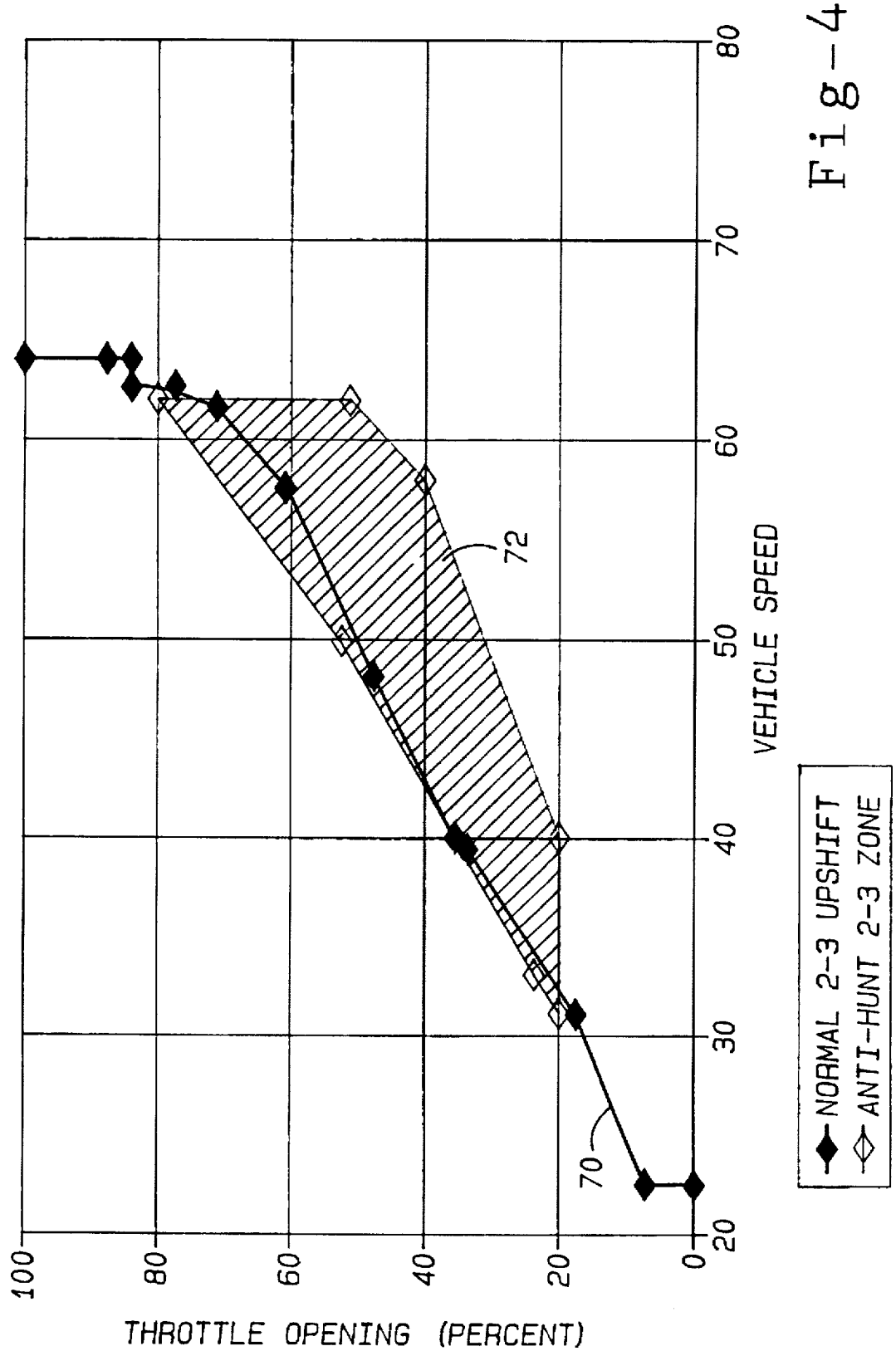
FIG. 4 is a graph illustrating transmission gear shift points based on output shaft speed and throttle opening percentage.

Proceeding to decision block 60, control methodology 40 will check to see if the transmission operating conditions are within an allowable shift zone indicative of allowing an upshift to occur. This is generally accomplished by looking up the allowable shift pattern signal 26 from look-up table 28 based on throttle position and either vehicle speed or output shaft speed. With particular reference to FIG. 4, a graph is shown illustrating both a conventional 2–3 upshift as indicated by line 70 and a 2–3 anti-hunt shift zone 72 provided by the shaded region for an anti-hunt shift. With the conventional 2–3 upshift line 70, the transmission is controlled to perform a 2–3 upshift whenever vehicle speed exceeds the shift boundary 70 for the given throttle opening position.

With the anti-hunt control routine of the present invention, if the vehicle speed for a given throttle opening position is within the allowable shift zone provided by shaded region 72, a 2–3 shift will occur only when the projected post shift acceleration $\alpha_{PS}$ exceeds a threshold value. Should vehicle speed for a given throttle opening position exceed the anti-hunt 2–3 shift zone 72, a shift will automatically be evoked regardless of the projected post shift acceleration value $\alpha_{PS}$. Further, the 2–3 anti-hunt shift zone 72 extends to lower speeds for a given throttle opening position in contrast to the conventional approach and therefore may shift earlier at a slower speed to enhance fuel economy, if desired. Accordingly, the anti-hunt shift zone 72 is expanded both before and after the conventional 2–3 upshift schedule 70. By extending the shift zone for a greater speed, the upshifts are prevented when such upshifts are not sufficient to prevent a shift hunting condition from occurring. It should be understood that shift zones are also provided for the other transmission gear upshifts that may occur with the given transmission.

If the monitored transmission parameters are within the allowable shift zone, anti-hunt transmission control methodology 40 will proceed to calculate the current output torque $T_n$ and the road load torque $T_{RL}$ pursuant to block 62. Given the initial calculation of vehicle inertia I, acceleration $\alpha_n$ and output torque $T_n$ for the current transmission gear (n), the road load torque $T_{RL}$ is calculated as the product of vehicle inertia I and acceleration $\alpha_n$ subtracted from the current output torque $T_n$.

Thereafter, control methodology 40 will proceed to calculate output torque $T_{n+1}$ for the next upshift gear (n+1) and project available post shift acceleration $\alpha_{PS}$ for the next upshift gear (n+1) which is also referred to as the post shift gear. The projected post shift acceleration $\alpha_{PS}$ is equal to the difference in output torque $T_{n+1}$ for the upshift gear (n+1) and road load torque $T_{RL}$ divided by vehicle inertia I. The projected post shift acceleration $\alpha_{PS}$ provides an indication of the expected acceleration that will occur in the upshift gear. Accordingly, the projected post shift acceleration $\alpha_{PS}$ is compared with a post shift acceleration threshold 22 as provided in decision block 66. If the projected post shift acceleration $\alpha_{PS}$ exceeds the post shift acceleration threshold 22, control methodology 40 will proceed to force an upshift in gears to the upshift gear (n+1) of the automatic transmission pursuant to block 68. This will cause the transmission to shift to the upshift gear position provided in block 68 and thereafter continue to monitor the transmission for further shifts. If the projected post shift acceleration value $\alpha_n$ does not exceed the threshold value, control methodology 40 will continue to monitor system parameters as described above to determine whether conditions change to have a sufficient shift in transmission gears.

The predicted output torque $T_{n+1}$ available in the upshifted gear as described herein may be derived by ratiometrically adjusting the turbine speed for the new gear ratio and performing a look-up in the surface table for the projected turbine torque and multiplying by the new gear ratio for the upshift gear. Using the value for predicted output torque $T_{n+1}$ and previously identified values for road load torque $T_{RL}$ and learned vehicle inertia I, the expected post shift acceleration $\alpha_{PS}$ may be calculated.

In operation, the anti-hunt control methodology 40 will detect when the vehicle is stopped and thereafter calculate the vehicle inertia I. This is accomplished by looking up the output shaft torque in first gear just prior to an upshift and looking up torque in the upshift gear just after the upshift occurs. Likewise, acceleration is measured in first gear just prior to an upshift and also just after the upshift occurs to second gear. Vehicle inertia is then calculated as a difference in torque divided by the difference in acceleration. To account for vehicle losses, control methodology 40 calculates a road load torque as a function of the output shaft torque, vehicle inertia and acceleration. Anti-hunt transmission control methodology 40 projects post shift acceleration $\alpha_{ps}$ as a function of the expected torque in the upshift gear, road load torque and inertia. The projected post shift acceleration provides an indication of the acceleration of the output shaft to the transmission if the vehicle were to upshift. The projected post shift acceleration must exceed a threshold value which is retrieved from a look-up table based on throttle opening position. It should be appreciated that if road load torque will consume all available output torque after upshifting, the transmission will not perform an upshift. However, if sufficient acceleration may be realized after upshifting, the transmission will perform an upshift if the acceleration value exceeds the desired threshold and if the vehicle speed and throttle position are within the allowable shift zone. This control methodology ensures that the shift hunting should be prevented.

While a specific embodiment of the invention has been shown and described in detail to illustrate the principles of the present invention, it should be understood that the invention may be embodied otherwise without departing from such principles. For example, one skilled in the art will readily recognize from such discussion and from the accompanying drawings that various changes, modifications and variations can be made without departing from the spirit and scope of the present invention as described in the following claims.

What is claimed is:

1. A method of adaptively controlling transmission gear upshifts in an automatic transmission of a vehicle so as to prevent shift hunting, said method comprising the steps of:

determining if an upshift condition is in progress;

determining output torque of an automatic transmission after an upshift condition is detected and after expiration of a predetermined time period;

predicting output torque for an upshift condition of the automatic transmission;

predicting post shift acceleration that is available from a transmission upshift as a function of the predicted output torque;

comparing the predicted post shift acceleration with a threshold value; and inhibiting a transmission upshift when the predicted post shift acceleration does not exceed the threshold value, and allowing the transmission upshift when the predicted available post shift acceleration exceeds the threshold value.

2. The method as defined in claim 1 further comprising the step of determining vehicle inertia during an initial transmission gear upshift condition.

3. The method as defined in claim 1 wherein the predicted post shift acceleration is determined as a function of the determined output torque for the upshift condition, road load torque and vehicle inertia.

4. The method as defined in claim 1 wherein the threshold value is provided as a function of throttle position.

5. A method of controlling transmission gear shifts in an automatic transmission of a vehicle so as to prevent the occurrence of shift hunting, said method comprising the step of:

engaging the automatic transmission in a first gear;
   determining output torque while engaged in the first gear;
   predicting torque available in an upshift condition of the transmission to a second gear;
   determining a vehicle inertia learned during the upshift condition of the transmission to second gear after each time the vehicle is stopped;
   predicting post shift acceleration that is available in the second gear as a function of the learned vehicle inertia and the predicted torque;
   comparing the predicted post shift acceleration to a threshold value; and
   inhibiting a transmission upshift when the predicted post shift acceleration does not exceed the threshold value, and allowing a transmission gear upshift from the first gear to the second gear when the projected acceleration exceeds the threshold value.

6. The method as defined in claim 5 wherein said post shift acceleration is determined further as a function of road load torque.

7. The method as defined in claim 6 wherein said road load torque is determined as a function of transmission torque, inertia and acceleration.

8. The method as defined in claim 5 wherein the threshold value is provided as a function of throttle position.

9. The method as defined in claim 5 wherein said vehicle inertia is determined during an initial transmission gear upshift condition.

10. A method of controlling transmission gear shifts in an automatic transmission of a vehicle so as to prevent the occurrence of shift hunting, said method comprising the steps of:

determining output torque of an automatic transmission;
    predicting output torque for an upshift condition of the automatic transmission;
    determining a learned vehicle inertia that changes in response to each occurrence of a predetermined vehicle condition;
    determining a road load torque associated with vehicle losses;
    predicting a post shift acceleration that is available in the upshift condition as a function of the learned vehicle inertia, the predicted torque and road load torque;
    comparing the predicted post shift acceleration to a threshold value; and
    inhibiting a transmission upshift when the predicted post shift acceleration does not exceed the threshold value, and allowing a transmission gear upshift from the first gear to the second gear when the projected acceleration exceeds the threshold value.

11. The method as defined in claim 10 wherein said threshold value is provided as a function of throttle position.

12. An automatic transmission of a vehicle that prevents the occurrence of shift hunting, said automatic transmission comprising:

a first gear;
    a second gear which has a lower numeric gear ratio than the first gear;
    means for determining torque in the first gear;
    means for predicting torque available in an upshift condition of the transmission to the second gear;
    means for predicting post shift acceleration available in an upshift condition of the transmission to the second gear based on predicted torque, and a vehicle inertia that changes in response to each occurrence of a predetermined vehicle condition;
    comparison means for comparing the predicted post shift acceleration with a threshold value; and control means for preventing an upshift from the first gear to the second gear when the predicted post shift acceleration does not exceed the threshold value, said control means allowing an upshift from the first gear to the second gear when the projected acceleration exceeds the threshold value.

13. The automatic transmission as defined in claim 12 further comprising means for detecting an initial vehicle inertia, said predicted post shift acceleration being determined from said vehicle inertia torque.

14. The automatic transmission claim as defined in claim 13 wherein said predicted post shift acceleration is determined as a function of vehicle inertia, road load torque and output torque.

* * * * *